(No Model.) 2 Sheets—Sheet 1.

M. B. SKAGGS.
RAISIN TRAY TURNER.

No. 504,254. Patented Aug. 29, 1893.

Witnesses,
J. Rouse
J. H. Bayless

Inventor,
Milton B. Skaggs
By Dewey & Co. Attys (No Model.) 2 Sheets—Sheet 2.

M. B. SKAGGS.
RAISIN TRAY TURNER.

No. 504,254. Patented Aug. 29, 1893.

Witnesses,

Inventor
Milton B. Skaggs
By Dewey & Co.
Attys

UNITED STATES PATENT OFFICE.

MILTON B. SKAGGS, OF BRENTWOOD, CALIFORNIA.

RAISIN-TRAY TURNER.

SPECIFICATION forming part of Letters Patent No. 504,254, dated August 29, 1893.

Application filed August 9, 1892. Serial No. 442,614. (No model.)

*To all whom it may concern:*

Be it known that I, MILTON B. SKAGGS, a citizen of the United States, residing at Brentwood, Contra Costa county, State of California, have invented an Improvement in Raisin-Tray Turners; and I hereby declare the following to be a full, clear, and exact description of the same.

My invention relates to a device for turning raisin trays in the field.

It consists in certain details of construction which will be more fully explained by reference to the accompanying drawings, in which—

Figure 1:
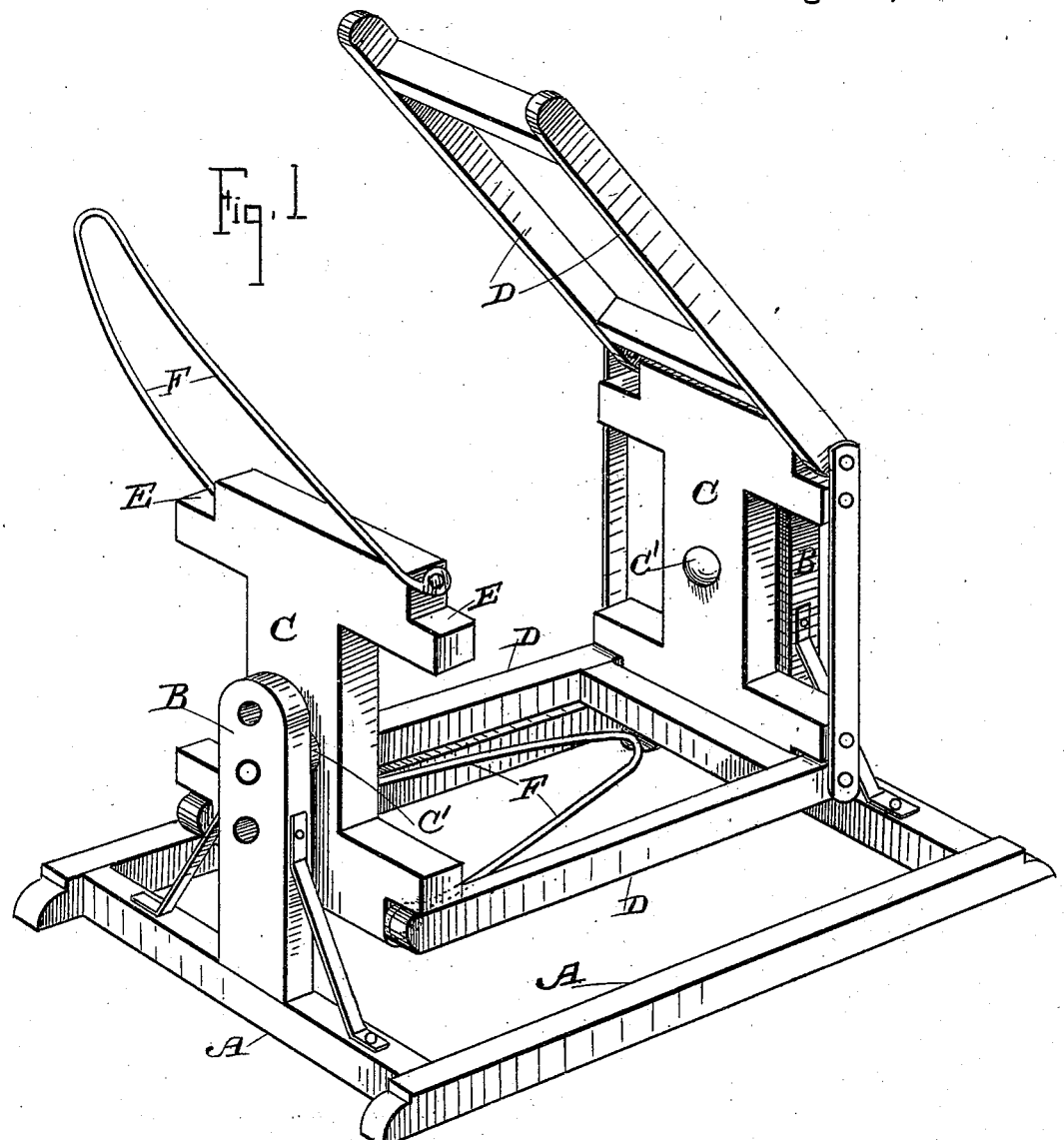
Figure 2:
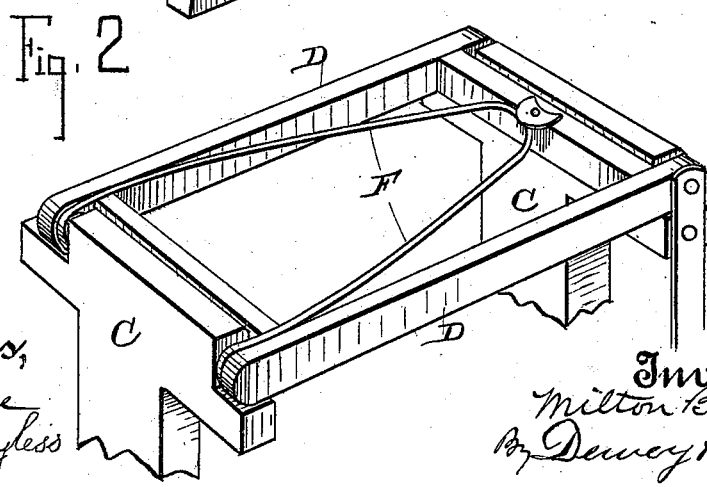
Figure 3:
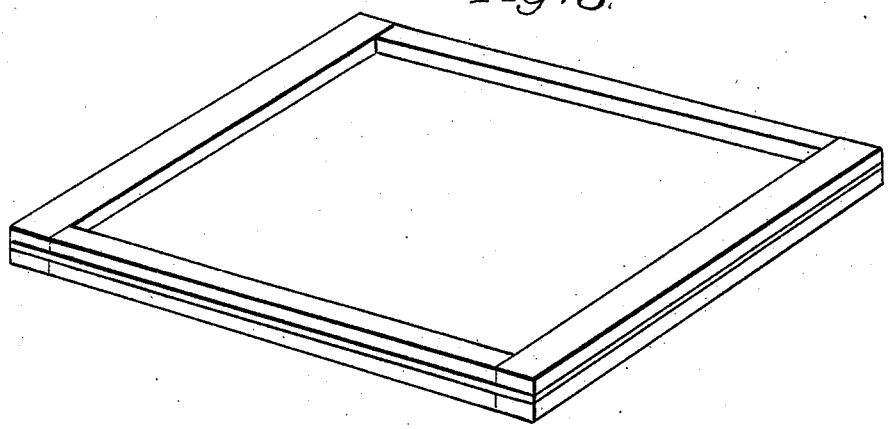
Figure 4:
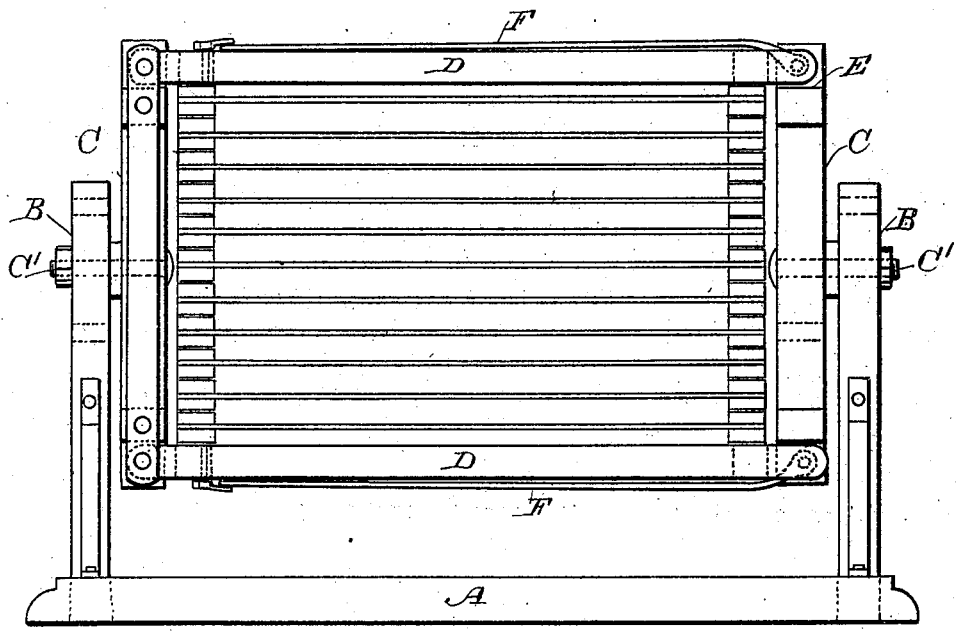

Figure 1 is a view of my improved device, showing the hinged frame released and raised so as to admit the tray. Fig. 2 is a portion of the device showing the frame secured. Fig. 3, is a detail perspective of one of the trays. Fig. 4, is a side view of the device showing the trays in position.

When grapes are prepared for drying in the field, they are placed upon trays which are usually about two by three feet in their dimensions, and consist of boards or strips having cleats across the ends to hold them together and keep them in shape. Upon these boards the grapes are placed in sufficient numbers to fill the trays which are then disposed about the field in suitable position for drying. After they are dried upon one side, it is necessary to turn them, and the usual method of turning is to place an empty tray upon the top of the partially dried fruit, then taking hold of the two trays reverse them, afterward removing the one which remains on top, thus leaving what was previously the lower surface of the fruit exposed upon the new tray so that it can be placed in readiness for drying. This work of turning the grapes necessitates the employment of two men, and is extremely laborious. My invention is designed to overcome this difficulty and make it possible to turn a large number of trays at a single operation, with the employment of a single man.

A is a base or frame of any suitable construction having standards B fixed centrally at the ends.

C C are frames having journals C' projecting from the center of one side of each, these journals entering suitable openings or boxes in the vertical standards B, so that the frames C stand transversely and interior to the standards. Upon one of these frames, and upon opposite edges of the frame, are hinged the bars or frames D. These bars or frames D are of such length that when closed down, the opposite or free ends rest upon shoulders or supporting ledges E upon the opposing corresponding frame C so that when they are closed down upon these frames they form an open rectangular box or frame. Locking devices F are so arranged as to hold these hinged sides in place when they are closed down, and the whole rectangular frame thus becomes a single rigid structure.

The operation of the device will then be as follows:—One of the hinged sides D remains closed, and the other is released from its fastening latch and opened, the device being turned so that the closed side is at the bottom. Upon this side are placed the trays of fruit, one above another, until the frame is filled to the top, the last tray at the top being an empty one. The upper hinged frame is then closed down upon the top of the upper tray, and the latch or holding device is turned down and fastened, thus clamping the whole securely together and upon the trays. In this position it is only necessary to turn the frame upon its journal pins until the trays are reversed, after which the uppermost of the hinged doors or frames is released and opened, and the trays are removed in the same manner that they were placed in the apparatus. This reversal of the trays will have turned the fruit, and it will be left lying upon the opposite sides of the trays which were above when they were put into the apparatus. They can then be taken out and placed in position for drying the newly exposed side of the fruit.

This device is designed to hold twenty-five or more trays for one load, and these can all be turned at once, one man being all that is necessary to place them in the frame and remove them therefrom.

As the trays vary somewhat in size in different vineyards, I have shown the standards B having different holes made for the reception of the journal pins so that the frame can be raised or depressed to adjust it for trays of different lengths. It will be manifest that various mechanisms, such as screws or racks might be employed for this purpose, but I do not consider it necessary to complicate the machine by such devices.

When the trays are to be gathered, after the fruit is entirely dried, for the purpose of placing the raisins in what are termed "sweat boxes," these turning devices may be conveniently employed for this purpose, being put upon the vineyard truck, and the trays placed in the turning frame until the frame is full when they are locked in place and the load conveyed to the sweat house.

Various fastenings may be employed for the hinged sides of the frame, but I have found that the lever fastenings here shown are very convenient and easily manipulated.

Having thus described my invention, what I claim as new, and desire to secure by Letters Patent, is—

A device for turning raisin trays, consisting of an open frame-work formed of transverse end frames having journal pins, supporting standards in which said journals rotate, opposing sides, one end of which is hinged to one of the transverse end frames, and shoulders upon the opposite frame upon which said sides are closed, independent locking clamps whereby either of the doors may be locked while the other is opened for the reception of trays, the closed side serving as a bottom upon which the trays are piled, and the opposite side, after being locked, serving as a bottom for the support of the trays in their reversed position, while the first side is opened to admit of their removal, substantially as herein described.

In witness whereof I have hereunto set my hand.

MILTON B. SKAGGS.

Witnesses:
S. H. NOURSE,
J. A. BAYLESS.